(12) United States Patent
Li et al.

(10) Patent No.: US 11,216,353 B2
(45) Date of Patent: Jan. 4, 2022

(54) DATA VISUAL ANALYSIS METHOD, SYSTEM AND TERMINAL AND COMPUTER READABLE STORAGE MEDIUM

(71) Applicant: Baidu Online Network Technology (Beijing) Co., Ltd, Beijing (CN)

(72) Inventors: Yong Li, Beijing (CN); Zhi Feng, Beijing (CN); Zhiqiang Zhang, Beijing (CN); Haizhu Li, Beijing (CN); Shun Zhang, Beijing (CN); Yunzhu Wang, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 200 days.

(21) Appl. No.: 16/106,173

(22) Filed: Aug. 21, 2018

(65) Prior Publication Data

US 2019/0196933 A1 Jun. 27, 2019

(30) Foreign Application Priority Data

Dec. 21, 2017 (CN) .......................... 201711396328.X

(51) Int. Cl.
*G06F 11/34* (2006.01)
*G06F 16/904* (2019.01)

(52) U.S. Cl.
CPC ...... *G06F 11/3447* (2013.01); *G06F 11/3495* (2013.01); *G06F 16/904* (2019.01)

(58) Field of Classification Search
CPC . G06F 11/3447; G06F 11/3495; G06F 16/904
See application file for complete search history.

(56) References Cited

U.S. PATENT DOCUMENTS

| 7,219,307 | B2 | 5/2007 | Senay | |
|---|---|---|---|---|
| 2003/0225604 | A1* | 12/2003 | Casati | ............ G06Q 10/06 705/7.11 |
| 2005/0125213 | A1* | 6/2005 | Chen | ............ G06F 11/3414 703/22 |

(Continued)

FOREIGN PATENT DOCUMENTS

| CN | 103984702 A | 8/2014 |
|---|---|---|
| CN | 105631027 A | 6/2016 |

(Continued)

OTHER PUBLICATIONS

Notification of the First Office Action dated Oct. 28, 2019 for Chinese Application No. 201711396328.X.

(Continued)

*Primary Examiner* — Raymond L Nimox
(74) *Attorney, Agent, or Firm* — Akerman LLP

(57) ABSTRACT

A data visual analysis method, system and terminal, and a computer readable storage medium are provided. The method includes: obtaining to-be-analyzed parameters and generating a data analysis model, the data analysis model including a plurality of execution units; the data sources collecting data information related to the to-be-analyzed parameters; the execution units performing analysis on the data information collected by the data sources, to obtain execution results of the execution units; and visually outputting the execution results of the execution units.

11 Claims, 2 Drawing Sheets

(56) References Cited

U.S. PATENT DOCUMENTS

| | | | | |
|---|---|---|---|---|
| 2009/0070743 | A1* | 3/2009 | Alfors | G06F 11/3604 |
| | | | | 717/125 |
| 2015/0317234 | A1* | 11/2015 | Ligman | G06F 11/3692 |
| | | | | 714/38.1 |
| 2016/0259626 | A1* | 9/2016 | Thattai | G06Q 10/103 |
| 2017/0132277 | A1* | 5/2017 | Hsiao | G06Q 10/06 |
| 2017/0316114 | A1* | 11/2017 | Bourhani | G06F 3/0482 |
| 2019/0138348 | A1* | 5/2019 | Holder | G06F 9/4843 |

FOREIGN PATENT DOCUMENTS

| | | | |
|---|---|---|---|
| CN | 105912588 | A | 8/2016 |
| CN | 106354786 | A | 1/2017 |
| CN | 106959990 | A | 7/2017 |
| CN | 107122359 | A | 9/2017 |
| CN | 107169575 | A | 9/2017 |
| CN | 107450902 | A | 12/2017 |

OTHER PUBLICATIONS

Search Report dated Oct. 18, 2019 for Chinese Application No. 201711396328.X.
Notification of Second Office Action dated Apr. 8, 2020 in connection with Chinese Application No. 201711396328X.
Search Report dated Mar. 31, 2020 in connection with Chinese Application No. 201711396328X.
Notification of Fourth Office Action dated Sep. 3, 2021 in connection with Chinese Application No. 201711396328X.
Search Report dated Aug. 26, 2021 in connection with Chinese Application No. 201711396328X.

* cited by examiner

DATA VISUAL ANALYSIS METHOD, SYSTEM AND TERMINAL AND COMPUTER READABLE STORAGE MEDIUM

CROSS-REFERENCE TO RELATED APPLICATION

This application claims priority to Chinese Patent Application No. 201711396328.X, filed on Dec. 21, 2017, which is hereby incorporated by reference in its entirety.

FIELD OF THE DISCLOSURE

The present disclosure relates to the technical field of big data visual analysis, and particularly to a data visual analysis method, system and terminal and a computer readable storage medium.

BACKGROUND OF THE DISCLOSURE

As information application degree develops constantly, enterprises accumulate business-related massive data during production and operation, and these data become intangible assets of the enterprises. How to reasonably and effectively use these data to obtain favorable guidance for the enterprises' development is a problem to be solved. A BI (Business Intelligence) system can perform effective integration for current data in the enterprises, and quickly and accurately provide visual analysis and statement construction, to help the enterprises to work out business operation policies and guidance.

However, a current BI system is not quick enough to process massive data. Upon processing PB-level or TB-level data, the BI system must rely on other data processing tools to temporarily store to-be-processed data in an intermediate storage medium, thereby increasing the data processing procedure. Meanwhile, the current BI system can only perform visual analysis according to a final execution result of a data model. When the model needs to be modified, the whole data model needs to be iterated again, thereby increasing the data processing time. On the other hand, the current BI system can only build a model for fixed scenarios preset by the system and cannot perform personalized modelling and data analysis according to the user's demands, so it is difficult for the current BI system to satisfy the user's demands for performing visual analysis according its own business.

The above information disclosed in Background of the Disclosure is only used to reinforce understanding of the background of the present disclosure, so it might contain information that is not yet formed as prior art known by those having ordinary skill in the art.

SUMMARY OF THE DISCLOSURE

Embodiments of the present disclosure provide a data visual analysis method, system and terminal, and a computer readable storage medium, to solve one or more of above technical problems.

In a first aspect, embodiments of the present disclosure provide a data visual analysis method, including:
  obtaining to-be-analyzed parameters;
  generating a data analysis model according to the to-be-analyzed parameters, the data analysis model including a plurality of execution units;
  executing the execution units respectively to invoke data sources corresponding to the execution units;
  collecting, by the data sources, data information related to the to-be-analyzed parameters;
  performing, by the execution units, analysis on the data information collected by the data sources, to obtain execution results of the execution units; and
  visually outputting the execution results of the execution units.

In conjunction with the first aspect, in a first implementation mode of the first aspect of the present disclosure, the method further includes: updating the execution units according to the execution results.

In conjunction with the first implementation mode of the first aspect, in a second implementation mode of the first aspect of the present disclosure, the plurality of execution units includes a first execution unit and a second execution unit, the performing, by the execution units, analysis on the data information collected by the data sources, to obtain execution results of the execution units includes:
  performing, by the second execution unit, analysis on the data information collected by the data sources based on an execution result of the first execution unit, to obtain an execution result of the second execution unit; and
  the updating the execution units according to the execution results includes:
  updating the second execution unit according to the execution result of the second execution unit; and
  performing, by the updated second execution unit, analysis on the data information collected by the data sources based on an execution result of the first execution unit, to obtain an execution result of the updated second execution unit.

In conjunction with the first aspect, in a third implementation mode of the first aspect of the present disclosure, the method further includes:
  generating an execution result of the data analysis model according to the execution results of one or more execution units.

In conjunction with the first aspect, in a fourth implementation mode of the first aspect of the present disclosure, the to-be-analyzed parameters are user-defined parameters, and the generating the data analysis model according to the to-be-analyzed parameters includes:
  performing user-defined modeling according to the user-defined parameters to generate the data analysis model.

In conjunction with the first aspect, in a fifth implementation mode of the first aspect of the present disclosure, the to-be-analyzed parameters are preset parameters, and the generating the data analysis model according to the to-be-analyzed parameters includes:
  performing intrinsic modelling according to the preset parameters to generate the data analysis model.

According to the third implementation mode of the first aspect of the present disclosure, in a sixth implementation mode of the first aspect of the present disclosure, the method further includes:
  visually outputting the execution result of the data analysis model via an interaction interface.

According to any one of the first implementation mode to the sixth implementation mode of the first aspect of the present disclosure, in a seventh implementation mode of the first aspect of the present disclosure, the data sources may be data warehouses, databases, computing engines, computer files or network files.

In a second aspect, embodiments of the present disclosure provide a data visual analysis system, including:
  an obtaining module configured to obtain to-be-analyzed parameters;

a data modeling module configured to generate a data analysis model according to the to-be-analyzed parameters, the data analysis model including a plurality of execution units;

an execution module configured to execute the execution units respectively to invoke data sources corresponding to the execution units;

a data source module configured to enable the data sources to collect data information related to the to-be-analyzed parameters;

an analysis module configured to enable the execution units to perform analysis on the data information collected by the data sources, to obtain execution results of the execution units; and a visualization module configured to visually output the execution results of the execution units.

In a possible design, the execution units are updated according to the execution results.

In a possible design, the plurality of execution units include a first execution unit and a second execution unit, the performing, by the execution units, analysis on the data information collected by the data sources, to obtain execution results of the execution units includes:

performing, by the second execution unit, analysis on the data information collected by the data sources based on an execution result of the first execution unit, to obtain an execution result of the second execution unit; and updating the execution units according to the execution results includes:

updating the second execution unit according to the execution result of the second execution unit; and performing, by the updated second execution unit, analysis on the data information collected by the data sources based on an execution result of the first execution unit, to obtain an execution result of the updated second execution unit.

In a possible design, the to-be-analyzed parameters are user-defined parameters, and generating the data analysis model according to the to-be-analyzed parameters includes:

performing user-defined modeling according to the user-defined parameters to generate the data analysis model.

In a third aspect, embodiments of the present disclosure provide a data visual analysis terminal, including:

one or more processors, a storage device for storing one or more programs, the one or more programs, when executed by said one or more processors, enable said one or more processors to implement the method according to the first aspect.

In a fourth aspect, embodiments of the present disclosure provide a computer readable storage medium in which a computer program is stored, wherein the computer program, when executed by a processor, implements the data visual analysis method according to the first aspect.

One or more technical solution of the above technical solutions has the following advantages or advantageous effects: a modeling function of user-defining parameters can be provided, each execution unit of the data analysis model may be modified, the modified execution unit can directly obtain a result of a preceding step and continue to further execute the data analysis model, needless to iterate again, thereby reducing the procedure of searching massive data, and improving quickness and flexibility of computation and analysis of the data analysis model. Meanwhile, the intermediate execution result of each execution unit can be output visually.

The above summary is only intended for description purpose, not to limit in any manner. In addition to illustrative aspects, implementation modes and features described above, further aspects, implementation modes and features of the present disclosure will be made apparent by referring to drawings and the following detailed depictions.

BRIEF DESCRIPTION OF DRAWINGS

In the figures, unless otherwise specified, reference numbers throughout a plurality of figures represent the same or similar components or elements. These figures are not certainly drawn by scale. It should be appreciated that these figures only depict some embodiments disclosed according to the present disclosure, and should not be considered as limiting the scope of the present disclosure.

DETAILED DESCRIPTION OF PREFERRED EMBODIMENTS

The following text only simply describes some exemplary embodiments. As recognized by those skilled in the art, it is possible to modify the described embodiments in various different manners without departing from the spirit or scope of the present disclosure. Hence, the figures and depictions are considered as being substantially exemplary not restrictive.

Embodiment 1

Figure 1:
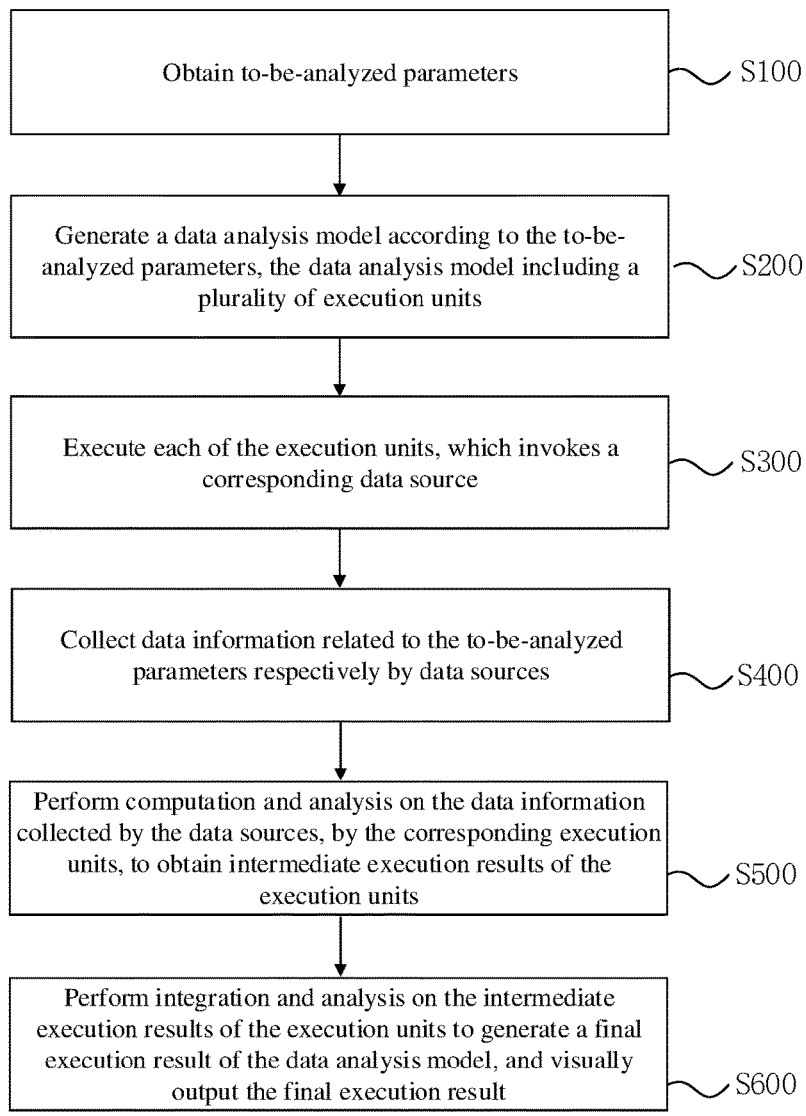
FIG. 1 is a schematic flow chart of a data visual analysis method according to an embodiment of the present disclosure.

The present embodiment of the present disclosure provides a data visual analysis method. As shown in FIG. 1, the method mainly includes steps S100-S600.

S100, to-be-analyzed parameters are obtained.

A manner of obtaining the to-be-analyzed parameters may be the parameter information inputted by the user himself, or parameter information invoked from other resources according to the user's instruction. The obtained to-be-analyzed parameters may include one or more parameter information, i.e., it is possible to perform visual analysis on one parameter, or perform comprehensive visual analysis on a plurality of parameters. A specific number of the to-be-analyzed parameters and manner of obtaining the to-be-analyzed parameters may be selected and adjusted according to an actual user's business demands, and are not limited in the scope defined in the present embodiment.

S200, a data analysis model is generated according to the to-be-analyzed parameters, the data analysis model including a plurality of execution units.

It is feasible to build a model according to the to-be-analyzed parameters and a user-formulated policy, and generate a data analysis model for performing subsequent analysis and computation on the to-be-analyzed parameters. The number of execution units of the data analysis model depends on the user's analysis demands and formulated policy. The data analysis model performs analysis through the plurality of execution units, and can make a generated final execution result more detailed and accurate.

It needs to be appreciated that the policy may be understood as the user's instruction, i.e., what kind of computation and analysis mode or method should be employed by the data analysis model and the execution units, or the data analysis model and the execution units should respectively perform computation and analysis for which data source. The policy may be the user's any demand, and not limited to the above examples.

S300, each of the execution units is executed, which invokes a corresponding data source according to an execution policy.

The execution units may perform processing on the same data source, or perform processing on different data sources respectively, or some of execution units perform processing on the same data source. A specific data source-selecting manner may be configured according to the execution policies defined by the user for the execution units.

For example, the data analysis model includes three execution units. The three execution units all perform processing on a first data source. Alternatively, the three execution units perform processing on three data sources respectively, i.e., the first execution unit performs processing on the first data source, the second execution unit performs processing on the second data source, and the third execution unit performs processing on the third data source. Again alternatively, the three execution units perform processing on two data sources, i.e., the first execution unit performs processing on the first data source, and the second and third execution units both perform processing on the second data source.

S400, data sources collect data information related to the to-be-analyzed parameters, respectively.

Each of the data sources screens information stored therein according to the to-be-analyzed parameters, removes information less related to or irrelevant to the to-be-analyzed parameters, and extracts data information meeting requirements of the to-be-analyzed parameters. The data sources may be data warehouses, databases, computing engines, computer files or network files, and data information may include external data and/or internal business data of the user enterprise.

S500, computation and analysis are performed on the data information collected by the data sources, by the corresponding execution units, to obtain intermediate execution results of the execution units, the intermediate execution results of the execution units being capable of being visually output respectively.

Each execution unit performs computation and analysis on the data information collected from a corresponding data source, and each execution unit can obtain an intermediate execution result with respect to the data information of the corresponding data source. Each intermediate execution result may be viewed and invoked by the user. To facilitate the user's intuitive and quick view, each intermediate execution result may be output visually. The visual output of the intermediate execution result is selected according to the user's demands, that is, the user may choose to visually output the intermediate execution result or not to visually output the intermediate execution result.

In a preferred implementation mode, it is possible to generate a visual analysis statement and a detailed business guidance policy for each intermediate execution result.

S600, integration and analysis are performed on the intermediate execution results of the execution units to generate a final execution result of the data analysis model, and the final execution result is visually output.

The final execution result may be a result obtained by directly integrating the respective intermediate execution results, or a result obtained by performing further analysis and computation on the respective intermediate execution results. A specific computation and analysis manner of the data analysis model depends on the designated policy when the user begins to build the model, or the user's selection.

The final execution result and intermediate execution results may be directly visually output, or stored while being visually output, so that the final execution result or intermediate execution results may be directly invoked upon subsequent use, and needn't be re-generated by the data analysis model.

On the basis of the first implementation mode, the execution units are updated according to the execution results (the intermediate execution results and/or the final execution result). When the user finds the final execution result undesirable and needs to adjust the execution policy after the final execution result has been generated by the generated data analysis model, the user only needs to find a problematic execution unit by looking up the execution result of each execution unit, and modify or adjust the execution unit.

On the basis of the first implementation mode, the plurality of execution units at least include a first execution unit and a second execution unit. The performing analysis on the data information collected by the data source by execution units to obtain the execution results of the execution units includes: the second execution unit performing analysis on the data information collected by the data source based on the execution result of the first execution unit, to obtain the execution result of the second execution unit; the updating the execution units according to the execution results includes: updating the second execution unit according to the execution result of the second execution unit; the updated second execution unit performing analysis on the data information collected by the data source according to the execution result of the first execution unit, to obtain the execution result of the updated second execution unit.

It needs to be appreciated that the execution units may further include a third execution unit, a fourth execution unit, . . . an $N^{th}$ execution unit. Any execution unit may use the execution result of a previous execution unit, and it is not limited to the second execution unit using the execution result of the first execution unit. It may be understood in a way that the modified and adjusted execution unit can directly use the intermediate execution result of the execution unit of a preceding step, and subsequent execution units of the data analysis model are performed starting from the modified and adjusted execution unit. It is unnecessary to rebuild the model, and thus effectively reduces the computation and analysis time of the data analysis model, and prevents the data analysis model from performing iterative computation again from the first execution unit, thereby implementing rapid repair of the data analysis model and improving the processing procedure of the whole visualization analysis.

On the basis of the first implementation mode, the data analysis model may execute one execution unit, a plurality of execution units or all execution units according to the user's instruction. When the user needs to check whether the data analysis model generated according to the policy meets business requirements, the user may monitor the execution units of the data analysis model, and check whether the intermediate execution results generated by each execution unit or a combination of a plurality of execution units meet requirements. When the presence of a problem is found, it is possible to rapidly perform modification and adjustment of the execution unit or modify and adjust the policy, and thereby improving the processing procedure of the whole visualization analysis, needless to wait for the data analysis model to generate the final execution result before determining whether to meet the user's business demands Especially when the data analysis model is wanted to perform analysis and computation on massive data information of big data, the analysis and computation procedure will consume a longer time period. If the intermediate execution results of the execution units can be looked up and adjusted at any time, it is feasible to reduce the time consumed by a wrong policy or wrong data analysis model, and effectively improve the data modelling efficiency.

On the basis of the first implementation mode, the to-be-analyzed parameters are user-defined parameters. Generating the data analysis model according to the to-be-analyzed parameters includes: performing user-defined modeling according to user-defined parameters, and generating the data analysis model. The user may, according to his own business demands, input any parameters, and generate a corresponding user-defined data analysis model for the user-defined parameters according to a policy needed by his own business demands, thereby increasing the flexibility of data visualization analysis so that the user can quickly build a model and perform visualization analysis upon handling a new scenario or urgent scenario, no longer limited to performing visualization analysis only according to an intrinsic scenario mode or a system-carried preset scenario mode.

It needs to be appreciated that, according to some embodiments, the scenario is the user's demand for visualization analysis. For example, it may be believed as a kind of scenario to make statistics of sales volume of products in this week, make statistics of the consumer flow in the shopping mall, make statistics of consumption levels of people in this region, or the like. The intrinsic scenario is a scenario mode which is duly preset and not modifiable, so the data analysis model corresponding to this scenario is not modifiable either. Therefore, this causes limitations of visualization analysis and failure to provide personalized service to clients with respect to their own business. The new scenario is a new data analysis model that the user wants to add according to business demands. The urgent scenario is a data analysis model which needs to temporarily perform visualization analysis according to sudden conditions. Adding the function of user-defining parameters may open the right to build the data analysis model so that the user can build the model as he like according to his own business demands and generate any visualization analysis statements and guidance policies.

In a preferred implementation mode, the user-defined parameters can be modified or expanded, and a new data analysis model is generated according to the modified or expanded user-defined parameters, thereby further opening the right so that the user can perform visualization analysis more freely according to his own business demands.

On the basis of the first implementation mode, the to-be-analyzed parameters are preset parameters, and intrinsic modelling is performed according to the preset parameters to generate the data analysis model. That is, the user inputs the preset parameters-specified data through the intrinsic scenario, and generates a corresponding intrinsic data analysis model.

In an implementation mode, an expansion function is also included. The expansion function includes storing the user-defined data analysis model generated by using the user-defined parameters, and using it as the intrinsic scenario for subsequent invocation at any time. The expansion function may further include setting an execution period of the data analysis model, namely, the user presets a time period, the data analysis model performs computation and analysis repeatedly according to the time period and updates the final execution result in real time so that the user can obtain latest visual analysis statements and guidance policies all the time.

On the basis of the first implementation mode, the final execution result and intermediate execution results can be visually output through an interaction interface to the user for use and analysis. An action visually output through the interaction interface may be an action executed after the user's trigger instruction is received, wherein the user's trigger instruction includes statement generation, statement preview, view zooming, view filtration, details lookup, and refresh.

On the basis of the first implementation mode, a plug-in management function is further included. In the plug-in management are stored related chart or graphic types and graphics which are used for generating visual analysis statements. For example, a chart and graph library and a control repository are stored in the plug-in management. The chart and graph library supports many chart and graph types. The chart and graph types include histogram, bar diagram, line chart, pie chart, area chart, combination chart, dashboard, and vector map, etc. The control repository includes a text frame, radio button, check box, picture, line, drop-down box, slider bar, drop-down list, button, and listing, etc.

Embodiment 2

Figure 2:
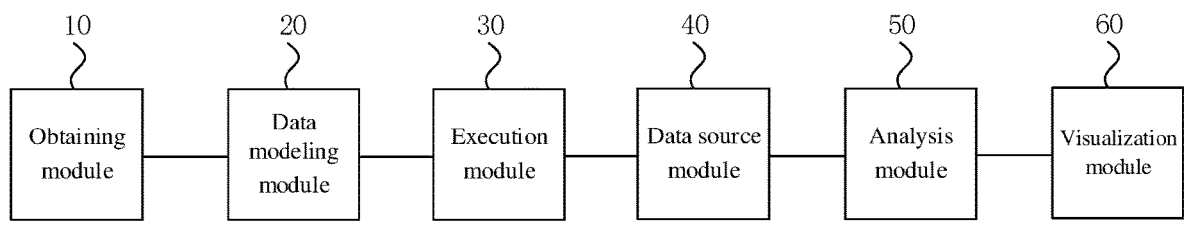
FIG. 2 is a structural schematic diagram of a data visual analysis system according to an embodiment of the present disclosure.

The embodiment of the present disclosure provides a data visual analysis system. As shown in FIG. 2, the system includes:

an obtaining module 10 configured to obtain to-be-analyzed parameters;

a data modeling module 20 configured to generate a data analysis model according to the to-be-analyzed parameters, the data analysis model including a plurality of execution units;

an execution module 30 configured to invoke a corresponding data source according to an execution policy of each execution unit;

a data source module 40 configured to use data sources to collect data information related to the to-be-analyzed parameters respectively;

an analysis module 50 configured to perform computation and analysis on the data information from the data sources by using the corresponding execution units, to obtain intermediate execution results of the execution units;

a visualization module 60 configured to perform integration and analysis for the intermediate execution results of the execution units to generate a final execution result of the data analysis model, and visually output the final execution result. The intermediate execution results of the execution units can also be visually output respectively.

In a possible design, the execution policy of each execution unit can be modified and adjusted.

In a possible design, the modified and adjusted execution unit can directly use the intermediate execution result of the execution unit of a preceding step.

In a possible design, the to-be-analyzed parameters are user-defined parameters, and user-defined modeling is performed according to the user-defined parameters to generate the data analysis model.

In a possible design, the to-be-analyzed parameters are preset parameters, and intrinsic modelling is performed according to the preset parameters to generate the data analysis model.

Figure 3:
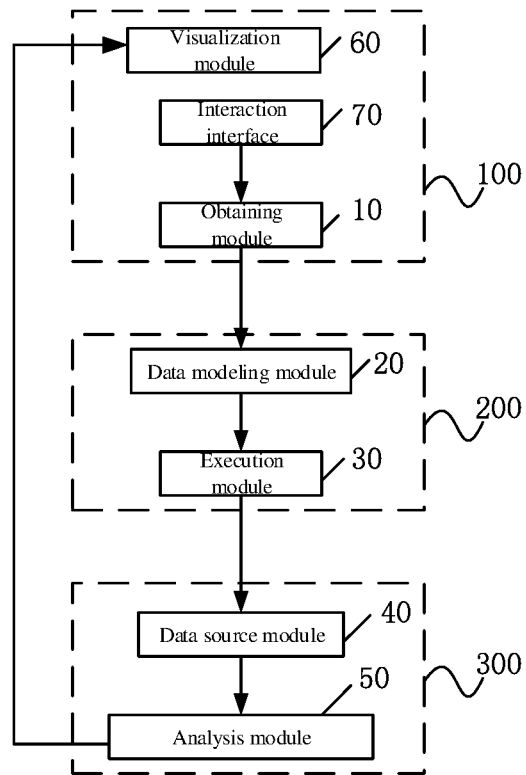
FIG. 3 is a schematic diagram of a specific structure of a data visual analysis system according to an embodiment of the present disclosure.

In a specific implementation mode, as shown in FIG. 3, the data visual analysis system includes an application layer 100, a service layer 200 and a resource layer 300. The application layer 100 includes the obtaining module 10, an interaction interface 70 and the visualization module 60. The service layer 200 includes the data modeling module 20 and the execution module 30. The resource layer 300 includes the data source module 40 and the analysis module 50.

In a variable design, the resource layer 300 further includes a storage module configured to store the final execution result and intermediate execution results. Whether the storage module needs to store the execution results needs to be determined according to the user's instruction.

The user first selects the to-be-analyzed data according to his own business, and inputs the to-be-analyzed data through the interaction interface 70 of the application layer 100, and the obtaining module 10 obtains the to-be-analyzed data input into the interaction interface 70. The data modeling module 20 in the service layer 200 generates the data analysis model according to the to-be-analyzed parameters. The data analysis model invokes a corresponding data source in the resource layer 300 through the execution module 30. The data source module 40 in the resource layer 300 uses data sources to respectively collect data information related to the to-be-analyzed parameters. The analysis module 50 performs computation and analysis for data sources to obtain intermediate execution results of the execution units of the data analysis model and the final execution result of the data analysis model, and the visualization module 60 of the application layer visually outputs the intermediate execution results and/or the final execution result.

Embodiment 3

Figure 4:
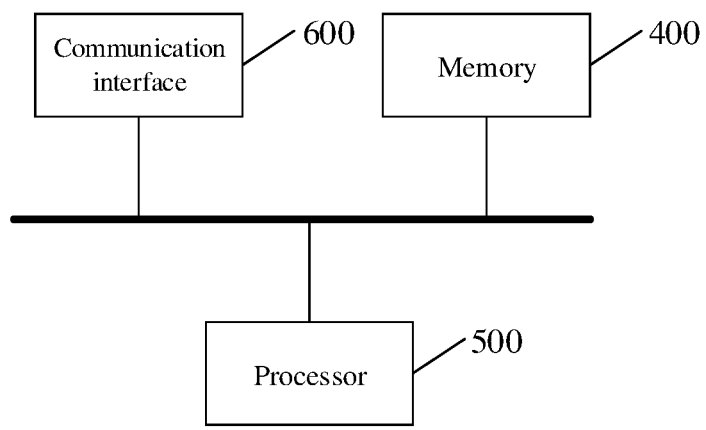
FIG. 4 is a structural schematic diagram of a data visual analysis terminal according to an embodiment of the present disclosure.

The embodiment of the present disclosure provides a data visual analysis terminal. As shown in FIG. 4, the data visual analysis terminal includes:

a memory 400 and a processor 500, a computer program runnable on the processor 500 being stored in the memory 400. The processor 500 implements the data visual analysis method described in the above embodiment upon executing the computer program. The number of the memory 400 and processor 500 may be one or more.

The data visual analysis terminal further includes a communication interface 600 configured to enable the memory 400 and the processor 500 to communicate with the external.

The memory 400 may include a high-speed RAM memory, or may further include a non-volatile memory, for example at least one magnetic disk memory.

If the memory 400, the processor 500 and the communication interface 600 are implemented separately, the memory 400, processor 500 and communication interface 600 may be interconnected via a bus and complete mutual communication. The bus may be an Industry Standard Architecture (ISA) bus, a Peripheral Component (PCI) bus or an Extended Industry Standard Component (EISA) bus. The bus may be classified into address bus, data bus, control bus and so on. For ease of illustration, the bus is represented with only one thick line in FIG. 3, but this does not mean that there is only one bus or one type of bus.

Optionally, upon specific implementation, if the memory 400, processor 500 and communication interface 600 are integrated on one chip, the memory 400, processor 500 and communication interface 600 may complete mutual communication via an internal interface.

Embodiment 4

The embodiment of the present disclosure provides a computer readable storage medium in which a computer program is stored, wherein the computer program, when executed by a processor, implements the data visual analysis method as stated in Embodiment 1.

In the depictions of the description, reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Furthermore, the described specific features, structures, materials, or characteristics may be combined in any suitable manner in one or more embodiments or examples. In addition, in the case of no mutual contradiction, those skilled in the art may incorporate or combine different embodiments or examples and features of different embodiments or examples described in the description.

In addition, terms "first" and "second" are only used for illustration purpose and cannot be understood as indicating or implying relative importance or implicitly indicating the number of the meant technical features. Hence, a feature defined by "first" or "second" may explicitly or implicitly indicate that at least one said feature is included. In the depictions of the present disclosure, "a plurality of" means two or more, unless otherwise definitely and specifically defined.

Any procedure or method described in the flow charts or described in any other way herein may be understood as a module, fragment or portion of code representing executable instructions that include one or more steps for implementing a particular logical function or process. Moreover, the scope of preferred embodiments of the present disclosure includes other implementations, which may not be in the order shown or discussed, including executing functions in a substantially simultaneous manner or in an opposite order according to the related functions. This should be understood by those skilled in the art which embodiments of the present disclosure belong to.

The logic and/or steps represented in the flowcharts or otherwise described herein, for example, may be considered as an ordered list of executable instructions for implementing logical functions, and may be embodied in any computer readable medium to be used by the instruction execution system, device or equipment (such as a computer-based system, a system including a processor, or another system that can fetch instructions and execute instructions from an instruction execution system, device and equipment), or to be used in combination with the instruction execution system, device and equipment. As to the specification, "the computer readable medium" may be any device that can contain, store, communicate, propagate, or transport a program to be used by or in combination with the instruction execution system, device or equipment.

In embodiments of the present disclosure, the computer readable medium may be a computer readable signal medium or a computer readable storage medium or any combination of the two. More specific examples (non-exhaustive list) of the computer readable storage medium at least include: an electrical connection (an electronic device)

with one or more wires, a portable computer disc box (a magnetic device), a random access memory (RAM), a read only memory (ROM), an erasable programmable read-only memory (EPROM or a flash memory), an optical fiber device and a portable read-only memory (CDROM). In addition, the computer readable storage medium may even be a paper or other appropriate medium on which the program can be printed, this is because, for example, the program can be obtained electronically, for example by optical scanning of paper or other media, followed by editing, interpretation or, if necessary, processing in other suitable manners, and then be stored it in the computer memory.

In embodiments of the present disclosure, the computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium other than the computer-readable storage medium, and the computer-readable medium may send, propagate or transmit a program for use by or in combination with an instruction execution system, an input method or a device. The program codes included by the computer-readable medium may be transmitted by any suitable medium, including, but not limited to radio, electric wire, optical cable, radio frequency (RF) or the like, or any suitable combination thereof.

It should be appreciated that each part of the present disclosure may be realized by the hardware, software, firmware or their combinations. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function for a data signal, an application-specific integrated circuit having an appropriate combination logic gate circuit, a programmable gate array (PGA), a field programmable gate array (FPGA), etc.

It should be understood by those skilled in the art that all or some of the steps in the method of the above embodiments can be implemented by instructing related hardware via programs, the program may be stored in a computer readable storage medium, and the program, when executed, includes one or a combinations of the steps of the method embodiments.

In addition, function units of the embodiments of the present disclosure may be integrated in a processing module, or these units may be separate physical existence, or two or more units are integrated in a module. The integrated module may be realized in a form of hardware or in a form of a software function module. When the integrated module is realized in a form of the software function module and is sold or used as a standalone product, the integrated module may be stored in a computer readable storage medium. The storage medium stated here may be a read only memory, a magnetic disk, an optical disk or the like.

What are described above are only specific implementation modes of the present disclosure, but the extent of protection of the present disclosure is not limited to this. Without departing from the technical scope revealed by the present disclosure, those skilled in the art can readily envisage various variations or substitutes, which are all covered by the extent of protection of the present disclosure. Hence, the extent of protection of the present disclosure should be subject to the protection scope of the appended claims.

What is claimed is:

1. A data visual analysis method, the method comprising:
    obtaining to-be-analyzed parameters from user's input or invoking to-be-analyzed parameters according to user's instruction;
    generating, by a processor, a data analysis model according to the to-be-analyzed parameters, the data analysis model including a plurality of execution units;
    executing the execution units respectively to invoke data sources corresponding to the execution units, wherein each execution unit corresponds to one data source;
    collecting, by the data sources, data information related to the to-be-analyzed parameters, wherein each of the data sources screens the data information stored therein according to the to-be-analyzed parameters, removes the data information less related to or irrelevant to the to-be-analyzed parameters, and extracts the data information meeting requirements of the to-be-analyzed parameters;
    performing, by the execution units, analysis on the data information collected by the corresponding data sources, to obtain intermediate execution results of the execution units;
    visually outputting, via an interaction interface, the intermediate execution results of the execution units to the user;
    integrating the intermediate execution results of the execution units to generate a final execution result of the data analysis model, and
    visually outputting, via the interaction interface, the final execution result to the user;
    wherein when the final execution result is undesirable, one or more of the plurality of execution units are modified according to the intermediate execution results and the final execution result, and only the one or more modified execution units and one or more subsequent execution units need to be re-executed.

2. The data visual analysis method according to claim 1, wherein the method further comprises:
    updating the execution units according to the intermediate execution results or the final execution result.

3. The data visual analysis method according to claim 2, wherein the plurality of execution units comprise a first execution unit and a second execution unit,
    the performing, by the execution units, analysis for the data information collected by the corresponding data sources, to obtain intermediate execution results of the execution units comprises:
    performing, by the second execution unit, analysis on the data information collected by the data sources based on an intermediate execution result of the first execution unit, to obtain an intermediate execution result of the second execution unit; and
    updating the execution units comprises:
    updating the second execution unit according to the intermediate execution result of the second execution unit; and
    performing, by the updated second execution unit, analysis on the data information collected by the data sources based on an intermediate execution result of the first execution unit, to obtain an intermediate execution result of the updated second execution unit.

4. The data visual analysis method according to claim 1, wherein the to-be-analyzed parameters are user-defined parameters, and the generating the data analysis model according to the to-be-analyzed parameters comprises:
performing user-defined modeling according to the user-defined parameters to generate the data analysis model.

5. The data visual analysis method according to claim 1, wherein the to-be-analyzed parameters are preset parameters, and the generating the data analysis model according to the to-be-analyzed parameters comprises:
performing intrinsic modelling according to the preset parameters to generate the data analysis model.

6. The data visual analysis method according to claim 1, wherein the data sources may be data warehouses, databases, computing engines, computer files or network files.

7. A data visual analysis system, wherein the system comprises:
one or more processors,
a storage device for storing one or more programs,
the one or more programs, when executed by said one or more processors, enable said one or more processors to:
obtain to-be-analyzed parameters from user's input or invoke to-be-analyzed parameters according to user's instruction;
generate a data analysis model according to the to-be-analyzed parameters, the data analysis model including a plurality of execution units;
execute the execution units respectively to invoke data sources corresponding to the execution units, wherein each execution unit corresponds to one data source;
enable data sources to collect data information related to the to-be-analyzed parameters, wherein each of the data sources screens the data information stored therein according to the to-be-analyzed parameters, removes the data information less related to or irrelevant to the to-be-analyzed parameters, and extracts the data information meeting requirements of the to-be-analyzed parameters;
enable the execution units to perform analysis on the data information collected by the corresponding data sources, to obtain intermediate execution results of the execution units;
visually output, via an interaction interface, the intermediate execution results of the execution units to the user;
integrating the intermediate execution results of the execution units to generate a final execution result of the data analysis model, and
visually outputting, via the interaction interface, the final execution result to the user;
wherein when the final execution result is undesirable, one or more of the plurality of execution units are modified according to the intermediate execution results and the final execution result, and only the one or more modified execution units and one or more subsequent execution units need to be re-executed.

8. The data visual analysis system according to claim 7, wherein the execution units are updated according to the intermediate execution results or the final execution result.

9. The data visual analysis system according to claim 7, wherein the plurality of execution units comprise a first execution unit and a second execution unit,
the one or more programs, when executed by said one or more processors, enable said one or more processors further to:
perform, by the second execution unit, analysis on the data information collected by the corresponding data sources based on an intermediate execution result of the first execution unit, to obtain an intermediate execution result of the second execution unit;
update the second execution unit according to the intermediate execution result of the second execution unit; and
perform, by the updated second execution unit, analysis on the data information collected by the data sources based on an intermediate execution result of the first execution unit, to obtain an intermediate execution result of the updated second execution unit.

10. The data visual analysis system according to claim 7, wherein the to-be-analyzed parameters are user-defined parameters, and the one or more programs, when executed by said one or more processors, enable said one or more processors further to:
perform user-defined modeling according to the user-defined parameters to generate the data analysis model.

11. A non-transitory computer readable storage medium in which a computer program is stored, wherein the computer program, when executed by a processor, implements the method according to claim 1.

* * * * *